US006916892B2

(12) United States Patent
Tharappel et al.

(10) Patent No.: US 6,916,892 B2
(45) Date of Patent: Jul. 12, 2005

(54) METHOD FOR TRANSITIONING BETWEEN ZIEGLER-NATTA AND METALLOCENE CATALYSTS IN A BULK LOOP REACTOR FOR THE PRODUCTION OF POLYPROPYLENE

(75) Inventors: Ronald Tharappel, Missouri City, TX (US); Renaud Oreins, Wavre (BE); William Gauthier, Houston, TX (US); David Attoe, Houston, TX (US); Kevin McGovern, Friendswood, TX (US); Michel Messiaen, Waterloo (BE); David Rauscher, Angleton, TX (US); Kai Hortmann, Dilbeek (BE); Michel Daumerie, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/295,927

(22) Filed: Nov. 15, 2002

(65) Prior Publication Data

US 2003/0114608 A1 Jun. 19, 2003

Related U.S. Application Data

(60) Provisional application No. 60/336,801, filed on Dec. 3, 2001.

(51) Int. Cl.[7] .................................................. C08F 4/42
(52) U.S. Cl. ....................... 526/113; 526/160; 526/943; 526/124.2; 526/351
(58) Field of Search ................................ 526/160, 943, 526/113, 124.2, 351

(56) References Cited

U.S. PATENT DOCUMENTS 3,687,920 A    8/1972   Johnson (Continued)

FOREIGN PATENT DOCUMENTS

EP            0277003        8/1988

(Continued)

*Primary Examiner*—Ling-Siu Choi
(74) *Attorney, Agent, or Firm*—Tenley R. Krueger

(57) ABSTRACT

The present invention relates to propylene polymerization process in a bulk loop reactor, and particularly to propylene polymerization process for polymerizing commercial quantities of polypropylene in a bulk loop reactor by sequentially introducing Ziegler-Natta and metallocene catalyst systems into the bulk loop reactor. In one embodiment, separate catalyst mixing systems are used to introduce a quantity of metallocene catalyst and Ziegler-Natta catalyst into the bulk loop reactor. The frequency rate at which the quantity of metallocene catalyst is introduced into the bulk loop reactor may be higher than the frequency rate at which the quantity of Ziegler-Natta catalyst is introduced. In another embodiment, a method of polymerizing propylene in a bulk loop reactor is provided which includes contacting a quantity of supported metallocene catalyst with a first quantity of scavenger, such as TEAL and or TIBAL, prior to injecting the supported metallocene catalyst into the bulk loop reactor and contacting a quantity of Ziegler-Natta catalyst system with a second quantity of scavenger prior to injecting the Ziegler-Natta catalyst system into the bulk loop reactor, wherein the second quantity of scavenger is greater that the first quantity of scavenger. In another embodiment, a method of contacting a flow of metallocene with a flow of propylene is provided. This method includes directing the flow of metallocene towards a junction, directing the flow of propylene towards the junction and maintaining a portion of the flow of metallocene separate from a portion of the flow propylene within a portion of the junction downstream of the flow of propylene into the junction. In another embodiment, a method of introducing a quantity of antifouling agent into a catalyst mixing system is provided. In this embodiment a portion of the antifouling agent is introduced at or downstream of a point of contact of a stream of propylene with a stream of catalyst. The antifouling agent may be a member, alone or in combination with other members, selected from the group consisting of Stadis 450 Conductivity Improver, Synperonic antifouling agent, and Pluronic antifouling agent.

8 Claims, 4 Drawing Sheets

U.S. PATENT DOCUMENTS

| | | | |
|---|---|---|---|
| 4,086,408 A | 4/1978 | Karol et al. | |
| 4,101,445 A | 7/1978 | Levine et al. | |
| 4,298,718 A | 11/1981 | Mayr et al. | |
| 4,376,191 A | 3/1983 | Geck | |
| 4,482,687 A | 11/1984 | Noshay et al. | |
| 4,530,914 A | 7/1985 | Ewen | |
| 4,542,199 A | 9/1985 | Kaminsky | |
| 4,544,717 A | 10/1985 | Mayr et al. | |
| 4,560,671 A | 12/1985 | Gross et al. | |
| 4,701,432 A | 10/1987 | Welborn et al. | |
| 4,719,193 A | 1/1988 | Levine et al. | |
| 4,755,495 A | 7/1988 | Cann et al. | |
| 4,769,910 A | 9/1988 | Noon | |
| 4,794,096 A | 12/1988 | Ewen | |
| 4,808,561 A | 2/1989 | Welborn | |
| 4,871,705 A | 10/1989 | Hoel | |
| 4,931,417 A | 6/1990 | Miya et al. | |
| 4,933,403 A | 6/1990 | Kaminsky | |
| 4,937,299 A | 6/1990 | Ewen et al. | |
| 4,975,403 A | 12/1990 | Ewen | |
| 4,987,200 A | 1/1991 | Datta et al. | |
| 5,017,714 A | 5/1991 | Welborn | |
| 5,019,633 A | 5/1991 | Wagner et al. | |
| 5,026,798 A | 6/1991 | Canich | |
| 5,057,475 A | 10/1991 | Canich | |
| 5,070,055 A | 12/1991 | Schramm et al. | |
| 5,103,031 A | 4/1992 | Smith | |
| 5,120,867 A | 6/1992 | Welborn | |
| 5,132,381 A | 7/1992 | Winter et al. | |
| 5,145,819 A | 9/1992 | Winter et al. | |
| 5,155,180 A | 10/1992 | Takada | |
| 5,198,401 A | 3/1993 | Turner et al. | |
| 5,225,458 A * | 7/1993 | Bailly et al. | 523/220 |
| 5,235,081 A | 8/1993 | Sangokoya | |
| 5,239,022 A | 8/1993 | Winter et al. | |
| 5,243,001 A | 9/1993 | Winter et al. | |
| 5,248,801 A | 9/1993 | Sangokoya | |
| 5,276,208 A | 1/1994 | Winter et al. | |
| 5,278,119 A | 1/1994 | Turner et al. | |
| 5,296,434 A | 3/1994 | Karl et al. | |
| 5,304,614 A | 4/1994 | Winter et al. | |
| 5,324,800 A | 6/1994 | Welborn | |
| 5,329,033 A | 7/1994 | Spaleck et al. | |
| 5,350,723 A | 9/1994 | Neithamer et al. | |
| 5,374,752 A | 12/1994 | Winter et al. | |
| 5,391,790 A | 2/1995 | Rohrmann et al. | |
| 5,436,305 A | 7/1995 | Alt et al. | |
| 5,442,019 A | 8/1995 | Agapiou et al. | |
| 5,510,502 A | 4/1996 | Sugano et al. | |
| 5,532,396 A | 7/1996 | Winter et al. | |
| 5,543,373 A | 8/1996 | Winter et al. | |
| 5,554,704 A | 9/1996 | Burkhardt et al. | |
| 5,589,549 A | 12/1996 | Govoni et al. | 525/247 |
| 5,636,437 A | 6/1997 | Kaschmitter et al. | |
| 5,643,847 A | 7/1997 | Walzer et al. | |
| 5,672,666 A | 9/1997 | Muhle et al. | |
| 5,672,668 A | 9/1997 | Winter et al. | |
| 6,087,029 A | 7/2000 | Golovin et al. | |
| 6,087,291 A | 7/2000 | Speca et al. | |
| 6,100,214 A | 8/2000 | Walzer et al. | |
| 6,114,479 A | 9/2000 | Speca et al. | |
| 6,117,955 A | 9/2000 | Agapiou et al. | |
| 6,124,230 A | 9/2000 | Speca et al. | |
| 6,140,432 A | 10/2000 | Agapiou et al. | |
| 6,194,341 B1 | 2/2001 | Canich et al. | |
| 6,218,558 B1 | 4/2001 | Kato et al. | |
| 6,225,251 B1 | 5/2001 | Shamshoum et al. | |
| 6,228,795 B1 | 5/2001 | Vinzzinni | |
| 6,245,706 B1 | 6/2001 | Hlatky | |
| 6,252,097 B1 | 6/2001 | Sugano | |
| 6,255,515 B1 | 7/2001 | Kato et al. | |
| 6,284,849 B1 * | 9/2001 | Almquist et al. | 526/82 |
| 6,376,407 B1 | 4/2002 | Burkhardt et al. | |
| 6,376,408 B1 | 4/2002 | Burkhardt et al. | |
| 6,376,409 B1 | 4/2002 | Burkhardt et al. | |
| 6,376,410 B1 | 4/2002 | Burkhardt et al. | |
| 6,376,411 B1 | 4/2002 | Burkhardt et al. | |
| 6,376,412 B1 | 4/2002 | Burkhardt et al. | |
| 6,376,413 B1 | 4/2002 | Kuchta et al. | |
| 6,376,627 B1 | 4/2002 | Burkhardt et al. | |
| 6,380,120 B1 | 4/2002 | Burkhardt et al. | |
| 6,380,121 B1 | 4/2002 | Kuchta et al. | |
| 6,380,122 B1 | 4/2002 | Kuchta et al. | |
| 6,380,123 B1 | 4/2002 | Kuchta et al. | |
| 6,380,124 B1 | 4/2002 | Burkhardt et al. | |
| 6,380,330 B1 | 4/2002 | Burkhardt et al. | |
| 6,380,331 B1 | 4/2002 | Kuchta et al. | |
| 6,380,334 B1 | 4/2002 | Kuchta et al. | |
| 6,399,723 B1 | 6/2002 | Burkhardt et al. | |

FOREIGN PATENT DOCUMENTS

| | | | |
|---|---|---|---|
| EP | 0277004 | | 8/1988 |
| EP | 0279586 | | 8/1988 |
| EP | 0426637 | | 5/1991 |
| EP | 0495375 | | 7/1992 |
| EP | 0500944 | | 9/1992 |
| EP | 0520732 | | 12/1992 |
| EP | 0549900 | | 7/1993 |
| EP | 0561476 | | 9/1993 |
| EP | 0570982 | | 11/1993 |
| EP | 0573403 | | 12/1993 |
| EP | 0576970 | | 1/1994 |
| EP | 0 586 168 A1 * | | 3/1994 |
| EP | 0594218 | | 4/1994 |
| EP | 0611773 | | 8/1994 |
| EP | 0 676 418 A1 * | | 10/1995 |
| EP | 0 705 848 A2 * | | 4/1996 |
| EP | 0 747 402 A1 * | | 12/1996 |
| EP | 0 717 755 B1 * | | 2/1999 |
| EP | 1083183 | | 3/2001 |
| WO | 9200333 | | 1/1992 |
| WO | 9407928 | | 4/1994 |
| WO | 9410180 | | 5/1994 |
| WO | 9732906 | | 9/1997 |
| WO | 9814585 | | 4/1998 |
| WO | 9822486 | | 5/1998 |
| WO | 0012565 | | 3/2000 |

\* cited by examiner

→ To 2nd Loop Reactor

METHOD FOR TRANSITIONING BETWEEN ZIEGLER-NATTA AND METALLOCENE CATALYSTS IN A BULK LOOP REACTOR FOR THE PRODUCTION OF POLYPROPYLENE

RELATED APPLICATIONS

This application claims the benefit of U.S. Provisional Application Ser. No. 60/336,801, filed Dec. 3, 2001, entitled "Method for Transitioning Between Ziegler-Natta and Metallocene Catalyst in a Bulk Loop Reactor for the Production of Polypropylene."

FIELD OF INVENTION

The invention relates generally to the production of polypropylene and polypropylene copolymers and, particularly, to the production of such polymers in bulk loop reactors.

BACKGROUND OF INVENTION

Polypropylene and polypropylene copolymers may be formed in a polymerization reactor in the presence of an appropriate catalyst. Propylene monomer is introduced into the reactor, alone or in combination with one or more other monomers, such as ethylene, to produce the polypropylene homopolymer or copolymer fluff or granules. The propylene polymer is withdrawn from the reactor and may be subjected to appropriate processing steps and then extruded as a thermoplastic mass through an extruder and die mechanism to produce the propylene polymer as a raw material in particulate form, usually as pellets. The propylene polymer pellets are ultimately heated and processed in the formation of the desired end products. Examples of such end products include fibers, webs (both woven and nonwoven), films, pipe, containers, and foamed articles. Other examples of such products made from propylene polymers include component parts of durable goods articles such as automotive interior and exterior components, and household appliance interior and exterior components One form of reactor suitable for polypropylene homopolymer and copolymer production is a bulk loop reactor. A bulk loop reactor may be formed from one or more interconnected loops having a continuous bore. The catalyst is distributed within the continuous bore by circulating liquid propylene monomer. In this way, propylene polymer polymerization occurs within the continuous bore. Two or more bulk loop reactors may be connected, such as for example in series. In this way, the polymerization conditions in each reactor may be the same or different to achieve desired polymer properties. Examples of polymerization conditions that may be varied include temperature, pressure, monomer content, co-monomer content, catalyst, co-catalyst and hydrogen concentration.

Polymer particles exiting the bulk loop reactor may be subjected to processing steps as described above or they may be introduced into one or more polymerization reactors, such as for example one or more gas phase reactors, for further polymerization with other monomers, such as ethylene, to alter the physical and chemical properties of the propylene polymer resins. Additionally, the physical and chemical properties of the propylene polymer resin may be tailored by the selection of one or more catalyst systems.

Because bulk loop reactors can produce propylene polymers on a substantially continuous basis, and at high outputs over an extended period of time, such as for example, from between 1 to at least 50 tons of propylene polymer per hour for between 5 days to up to 2 years and beyond, bulk loop reactors offer several advantages over other types of polypropylene reactors, such as stirred pot, stirred bed, and other non-substantially continuous reactors. However, while there may be more than one catalyst system useful for producing polypropylene, in some instances the presence of small quantities of one catalyst system or small quantities of one or more of the components thereof may interfere with or hinder the performance of another catalyst system. As such, while there may be several catalysts systems useful for the production of polypropylene, not all such catalysts systems are compatible in combination with each other. Furthermore, while the design and or physical environment within a bulk loop reactor and associated equipment may be suitable for production of polypropylenes using one catalyst system, these conditions and/or design may be less than suitable or less than desirable for production of polypropylenes using another catalyst system. Therefore, in order to take advantage of the benefits offered by bulk loop reactors, there exist a need to avoid such problems when using different catalyst systems in a common bulk loop reactor to produce propylene polymers.

SUMMARY OF THE INVENTION

The present invention relates to propylene polymerization process in a bulk loop reactor, and particularly to propylene polymerization process for polymerizing commercial quantities of polypropylene in a bulk loop reactor. In one embodiment, a method of polymerizing propylene in a bulk loop reactor by injecting a metallocene catalyst and a Ziegler-Natta catalyst system into the bulk loop reactor under propylene polymerization conditions is provided. In this embodiment, the bulk loop reactor has a first temperature range. A quantity of metallocene catalyst having a second temperature range is introduced into the bulk loop reactor at a first frequency rate from a first catalyst mixing system in communication with the bulk loop reactor. A quantity of Ziegler-Natta catalyst having a third temperature range is introduced into the bulk loop reactor at a second frequency rate from a second catalyst mixing system in communication with the bulk loop reactor. In this embodiment, the first frequency rate may be higher than the second frequency rate and the first temperature range may be higher than the second temperature range.

In another embodiment, a method of polymerizing propylene in a bulk loop reactor is provided which includes contacting a quantity of supported metallocene catalyst with a first quantity of scavenger prior to injecting the supported metallocene catalyst into the bulk loop reactor and contacting a quantity of Ziegler-Natta catalyst system with a second quantity of scavenger prior to injecting the Ziegler-Natta catalyst system into the bulk loop reactor under propylene polymerization conditions, wherein the second quantity of scavenger is greater that the first quantity of scavenger. In this embodiment, the scavenger may be TEAL.

In another embodiment, a method of contacting a flow of metallocene with a flow of propylene is provided. This method includes directing the flow of metallocene towards a junction, directing the flow of propylene towards the junction and maintaining a portion of the flow of metallocene separate from a portion of the flow propylene within a portion of the junction downstream of the flow of propylene into the junction. In this embodiment, the temperature of the flow of metallocene or flow of propylene may be in the range of between −10° C. and +10° C. In this embodiment, the flow rate downstream of the junction may be between 0.3 meters/second to 10 meters/second.

In another embodiment, a method of introducing a volume of antifouling agent into a catalyst mixing system is provided. In this embodiment a portion of the antifouling agent is introduced at or downstream of a point of contact of a stream of propylene with a stream of catalyst. The antifouling agent may be a member, alone or in combination with other members, selected from the group consisting of Stadis 450 Conductivity Improver, Synperonic, and Pluronic.

DETAILED DESCRIPTION

Conventional Ziegler-Natta Catalysts

Figure 1:
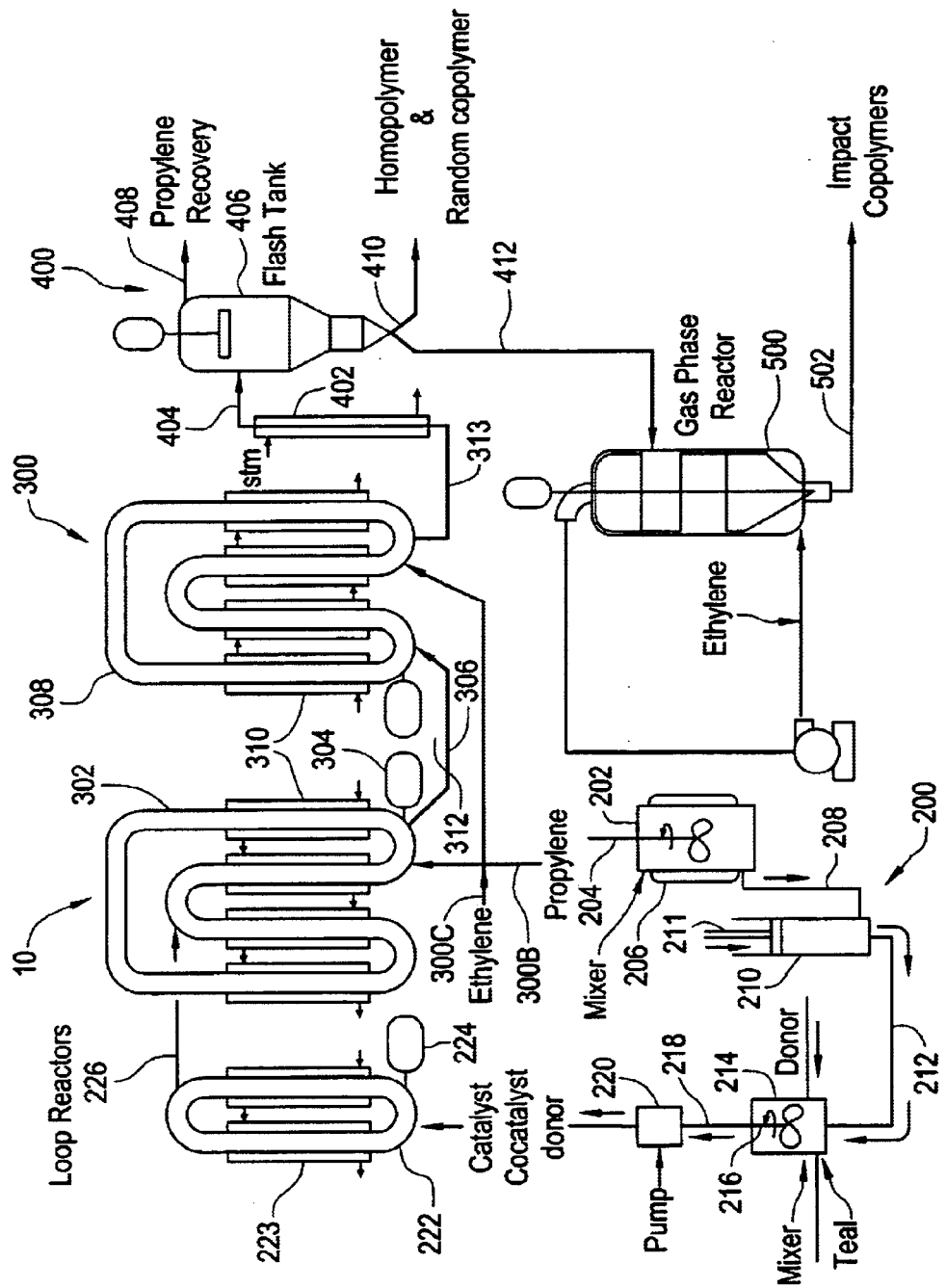
FIG. 1 is a schematic plan view of a bulk loop reactor system in combination with a gas phase reactor.

Traditionally, catalyst systems used in bulk loop reactors for the commercial production (polymer production in the range of between 1 and up to 5 tons/hour and desirably between at least 1 ton to at least 50 tons/hour over a period of between at least about 5 days up to at least about 2 years) of polypropylene homopolymers and/or copolymers are commonly know as conventional Ziegler-Natta catalyst systems (hereafter may also be referred to as "Ziegler-Natta catalysts" or "Ziegler-Natta catalyst systems"). Suitable conventional Ziegler-Natta catalysts are disclosed in, for example, U.S. Pat. No. 4,701,432 (in particular, see column 5 line 27 to column 6 line 5); U.S. Pat. No. 4,987,200 (in particular, see column 27 line 22 to column 28 line 17); U.S. Pat. Nos. 3,687,920; 4,086,408; 4,376,191; 5,019,633; 4,482,687; 4,101,445; 4,560,671; 4,719,193; 4,755,495; and 5,070,055, each of which is incorporated by reference herein in its entirety. These Ziegler-Natta catalyst systems can include a Ziegler-Natta catalyst, a support, one or more internal donors, and one or more external donors.

Conventional Ziegler-Natta catalysts are stereospecific complexes formed from a transition metal halide and a metal alkyl or hydride and can produce isotactic polypropylenes. The Ziegler-Natta catalysts are derived from a halide of a transition metal, such as titanium, chromium or vanadium with a metal hydride and/or metal alkyl, typically an organoaluminum compound as a co-catalyst. The catalyst is usually comprised of a titanium halide supported on a magnesium compound. Ziegler-Natta catalysts, such as titanium tetrachloride ($TiCl_4$) supported on an active magnesium dihalide, such as magnesium dichloride or magnesium dibromide, as disclosed, for example, in U.S. Pat. Nos. 4,298,718 and 4,544,717, both to Mayr et al. and incorporated by reference herein, are supported catalysts. Silica may also be used as a support. The supported catalyst may be employed in conjunction with a co-catalyst such as an alkylaluminum compound, for example, triethylaluminum (TEAL), trimethyl aluminum (TMA) and triisobutyl aluminum (TIBAL).

Conventional Ziegler-Natta catalysts may be used in conjunction with one or more internal electron donors. These internal electron donors are added during the preparation of the catalysts and may be combined with the support or otherwise complexed with the transition metal halide. A suitable Ziegler-Natta catalyst containing a diether-based internal donor compound is that available as Mitsui RK-100 and Mitsui RH-220, both manufactured by Mitsui Chemicals, Inc., Japan. The RK-100 catalyst additionally includes an internal phthalate donor. The Ziegler-Natta catalyst is typically a supported catalyst. Suitable support materials include magnesium compounds, such as magnesium halides, dialkoxymagnesiums, alkoxymagnesium halides, magnesium oxyhalides, dialkylmagnesiums, magnesium oxide, magnesium hydroxide, and carboxylates of magnesium. Typical magnesium levels are from about 12% to about 20% by weight of catalyst. The RK-100 catalyst contains approximately 2.3% by weight titanium, with approximately 17.3% by weight magnesium. The RH-220 catalyst contains approximately 3.4% by weight titanium, with approximately 14.5% by weight magnesium.

Conventional Ziegler-Natta catalysts may also be used in conjunction with one or more external donors. Generally such external donors act as stereoselective control agents to control the amount of atactic or non-stereoregular polymer produced during the reaction, thus reducing the amount of xylene solubles. Examples of external donors include the organosilicon compounds such as cyclohexylmethyl dimethoxysilane (CMDS), dicyclopentyl dimethoxysilane (CPDS) and diisopropyl dimethoxysilane (DIDS). External donors, however, may reduce catalyst activity and may tend to reduce the melt flow of the resulting polymer.

Metallocene Catalyst System

Other catalyst systems useful for polymerizing propylene are based upon metallocenes. However, unlike Ziegler-Natta catalysts, metallocenes traditionally have not been used in bulk loop reactors and more particularly, have not been used in bulk loop reactors to produce commercial quantities of polypropylene homopolymer and/or co-polymer. Metallocenes can be characterized generally as coordination compounds incorporating one or more cyclopentadienyl (Cp) groups (which may be substituted or unsubstituted and may be the same or different) coordinated with a transition metal through $\pi$ bonding. The Cp groups may also include substitution by linear, branched or cyclic hydrocarbyl radicals and desirably cyclic hydrocarbyl radicals so as to form other contiguous ring structures, including, for example indenyl, azulenyl and fluorenyl groups. These additional ring structures may also be substituted or unsubstituted by hydrocarbyl radicals and desirably C1–C20 hydrocarbyl radicals. Metallocene compounds may be combined with an activator and/or cocatalyst (as described in greater detail below) or the reaction product of an activator and/or cocatalyst, such as for example methylaluminoxane (MAO) and optionally an alkylation/scavenging agent such as trialkylaluminum compound (TEAL, TMA and/or TIBAL). Various types of metallocenes are known in the art which may be supported. Typical support may be any support such as talc, an inorganic oxide, clay, and clay minerals, ion-exchanged layered compounds, diatomaceous earth, silicates, zeolites or a resinous support material such as a polyolefin. Specific inorganic oxides include silica and alumina, used alone or in combination with other inorganic oxides such as magnesia, titania, zirconia and the like. Non-metallocene transition metal compounds, such as titanium tetrachloride, are also incorporated into the supported catalyst component. The inorganic oxides used as support are characterized as having an average particle size ranging from 30–600 microns, desirably from 30–100 microns, a surface area of 50–1,000 square meters per gram, desirably from 100–400 square meters per gram, a pore volume of 0.5–3.5 cc/g, desirably from about 0.5–2 cc/g.

Any metallocene may be used in the practice of the invention. As used herein unless otherwise indicated, "metallocene" includes a single metallocene composition or two or more metallocene compositions. Metallocenes are typically bulky ligand transition metal compounds generally represented by the formula:

$$[L]_mM[A]_n$$

where L is a bulky ligand, A is a leaving group, M is a transition metal and m and n are such that the total ligand valency corresponds to the transition metal valency.

The ligands L and A may be bridged to each other, and if two ligands L and/or A are present, they may be bridged. The metallocene compound may be full-sandwich compounds having two or more ligands L which may be cyclopentadienyl ligands or cyclopentadiene derived ligands or half-sandwich compounds having one ligand L, which is a cyclopentadienyl ligand or cyclopentadienyl derived ligand. The transition metal atom may be a Group 4, 5, or 6 transition metal and/or a metal from the lanthanide and actinide series. Zirconium, titanium, and hafnium are desirable. Other ligands may be bonded to the transition metal, such as a leaving group, such as but not limited to hydrocarbyl, hydrogen or any other univalent anionic ligand. A bridged metallocene, for example may, be described by the general formula:

RCpCp'MeQn.  (2)

Me denotes a transition metal element and Cp and Cp' each denote a cyclopentadienyl group, each being the same or different and which can be either substituted or unsubstituted, Q is an alkyl or other hydrocarbyl or a halogen group, n is a number and may be within the range of 1–3 and R is a structural bridge extending between the cyclopentadienyl rings. Metallocene catalysts and metallocene catalysts systems that produce isotactic polyolefins are disclosed in U.S. Pat. Nos. 4,794,096 and 4,975,403 which are incorporated by reference herein. These patents disclose chiral, stereorigid metallocene catalysts that polymerize olefins to form isotactic polymers and are especially useful in the polymerization of highly isotactic polypropylene.

Suitable metallocene catalysts are disclosed in, for example, U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,132,381; 5,155,180; 5,198,401; 5,278,119; 5,304,614; 5,324,800; 5,350,723; 5,391,790; 5,436,305; 5,510,502; 5,145,819; 5,243,001; 5,239,022; 5,329,033; 5,296,434; 5,276,208; 5,672,668; 5,304,614; 5,374,752; 5,510,502; 4,931,417; 5,532,396; 5,543,373; 6,100,214; 6,228,795; 6,124,230; 6,114,479; 6,117,955; 6,087,291; 6,140,432; 6,245,706; 6,194,341; 6,399,723; 6,380,334; 6,380,331; 6,380,330; 6,380,124; 6,380,123; 6,380,122; 6,380,121; 6,380,120; 6,376,627; 6,376,413; 6,376,412; 6,376,411; 6,376,410; 6,376,409; 6,376,408; 6,376,407; 5,635,437; 5,554,704; 6,218,558; 6,252,097, 6,255,515 and EP 549 900; 576 970; and 611 773; and WO 97/32906; 98/014585; 98/22486; and 00/12565, each of which is incorporated by reference herein in its entirety.

Metallocene Activators

Metallocenes may be used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes such as methylalumoxane (MAO) are commonly used as metallocene activators. Generally alkylalumoxanes contain about 5 to 40 of the repeating units.

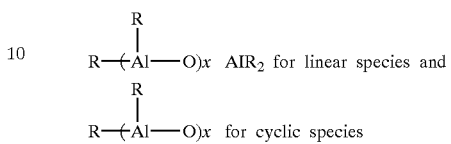

R─(Al─O)x AIR₂ for linear species and

R─(Al─O)x for cyclic species where R is a C1–C8 alkyl including mixed alkyls. Particularly desirable are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952, 540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP 0 279 586, EP-A-0 594 218 and WO 94/10180, each fully incorporated herein by reference. (As used herein unless otherwise stated "solution" refers to any mixture including suspensions.)

Ionizing activators may also be used to activate metallocenes. These activators are neutral or ionic, or are compounds such as tri(n-butyl)ammonium tetrakis (pentaflurophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a desirable method of preparation wherein metallocenes (bisCp and monoCp) are protanated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and napthyl.

The term "noncoordinating anion" ("NCA") means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion.

The use of ionizing ionic compounds not containing an active proton but capable of producing both the active metallocene cation and a noncoordinating anion is also known. See, for example, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris (pentafluorophenyl)borane, see EP-A-0 520 732 (incorporated herein by reference). Ionic catalysts for addition polymerization can also be prepared by oxidation of the metal centers of transition metal compounds by anion precursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-O 500 944 and EP-Al-0 570 982 (incorporated herein by reference) for in situ processes describing the reaction of alkyl aluminum compounds with dihalo-substituted metallocene compounds prior to or with the addition of activating anionic compounds.

Desirable methods for supporting ionic catalysts comprising metallocene cations and NCA are described in U.S. Pat. No. 5,643,847, U.S. patent application Ser. No. 09,184,358, filed Nov. 2, 1998 and U.S. patent application Ser. No. 09,184,389, filed Nov. 2, 1998 (all fully incorporated herein by reference). When using the support composition, these NCA support methods generally comprise using neutral anion precursors that are sufficiently strong Lewis acids to react with the hydroxyl reactive functionalities present on the silica surface such that the Lewis acid becomes covalently bound.

Additionally, when the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art.

Bulk Loop Reactor

An example of a bulk loop reactor system 10 suitable for propylene polymerization using one or more conventional Zeigler-Natta catalysts is illustrated in FIG. 1. The bulk loop reactor system 10 includes a catalyst mixing and injection system 200 upstream of and in communication with a pair of loop reactors 300, a polymer recovery system 400 downstream of the loop reactors 300 and a gas phase reactor 500. It will be understood that the bulk loop reactor system may include a single loop reactor or single gas phase reactor or multiple loop reactors and multiple gas phase reactors or any combination thereof, including one or more other olefin polymerization reactors, such as other propylene polymerization reactors. The bulk loop reactors 300 may further include a propylene feed conduit 300B and a co-monomer (such as for example, ethylene) feed conduit 300C.

The catalyst mixing and injection system 200 includes a mixing vessel 202. The mixing vessel 202 includes a mixing paddle 204 and a heating jacket 206. A high molecular weight mineral oil and the Ziegler-Natta catalyst are introduced into the mixing vessel 202. Generally the high molecular oil is heated to a sufficient temperature (in the range of from about 30° C. to at least 90° C., depending upon the type of mineral oil used) in order to reduce the viscosity of the mineral oil and allow the mixing paddle 204 to sufficiently mix the catalyst and high molecular mineral oil.

The heated mixture of high molecular weight mineral oil and catalyst is then conveyed via conduit 208 to an injector 210 where it may cool and form a "paste". The paste is urged during the compression stroke of the plunger 211 into the conduit 212 and into another mixing vessel 214 wherein a co-catalyst, such as TEAL, and one or more electron donors may be blended with the paste by the mixing paddle 216. The resulting mixture of catalyst, co-catalyst and electron donor exits the mixing vessel 214 via conduit 218 and is metered by the pump 220 into a pre-polymerization loop reactor 222 containing liquid propylene monomer. Polymerization temperatures in the pre-polymerization loop reactor 222 may be from between −10 and 10° C. and are controlled by cooling jackets 223. Propylene polymer granules are formed as propylene polymerization begins upon contact between the catalyst/co-catalyst and the liquid propylene monomer, all of which are circulated within the pre-polymerization loop reactor 222 by a circulation pump 224.

Pre-polymerization cycle time may last between 7 and at least 30 minutes, desirably between 15 and 20 minutes before the propylene polymer granules are conveyed via conduit 226 into the first loop reactor 302 containing liquid propylene monomer. A circulating pump 304 circulates the propylene granules and liquid propylene monomer within the first loop reactor 302. As propylene polymerization continues in the first loop reactor, the propylene polymer granules increase in size. The first loop reactor cycle time may last between 20 and at least 95 minutes, desirably between 30 and 50 minutes before the propylene polymer granules are conveyed via conduit 306 into the second loop reactor 308. Polymerization temperatures in the first and second loop reactors, 302 and 308 respectively, may range from between 66 to 77° C. and are controlled by cooling jackets 310. Circulation pump 312 circulates the propylene granules and liquid propylene monomer in the second loop reactor. The second loop reactor cycle time may last between 10 and at least 60 minutes, desirably between 20 and 50 minutes before the propylene polymer granules are conveyed via conduit 313 into the polymer recovery system 400. Generally, if no further olefin polymerization is desired, the catalyst is deactivated or "killed" before entering the polymer recovery system 400.

A heating column 402 receives the propylene polymer granules from the conduit 312. Sufficient heat is applied to the propylene polymer granules such that upon entering the flash tank 406 from the conduit 404, a substantial portion of the liquid propylene monomer accompanying the propylene polymer granules vaporizes, thus separating from the granules. The gaseous propylene and a portion of the polymerization by-products are extracted from the flash tank 406 via the conduit 408. This propylene may be recompressed, filtered, so as to remove impurities and other contaminates that may adversely react with the catalyst system, and returned to the loop reactors 300.

The propylene polymer granules exit the flash tank 406 via conduit 410 and may be directed to extruders for processing into pellets. Or, if further polymerization with one or more monomers, such as for example ethylene, is desired, the propylene polymer granules exiting the flash tank 406 via conduit 412 may be conveyed into the gas phase reactor 500. The propylene polymer granules exit the gas phase reactor 500 via conduit 502 and may be directed to extruders for processing into impact polypropylene copolymers pellets. During the pelletization process, one or more other materials, such as, for example, stabilizers, UV blockers, antistatic chemicals and/or pigments may be blended with the propylene polymer granules.

Figure 2:
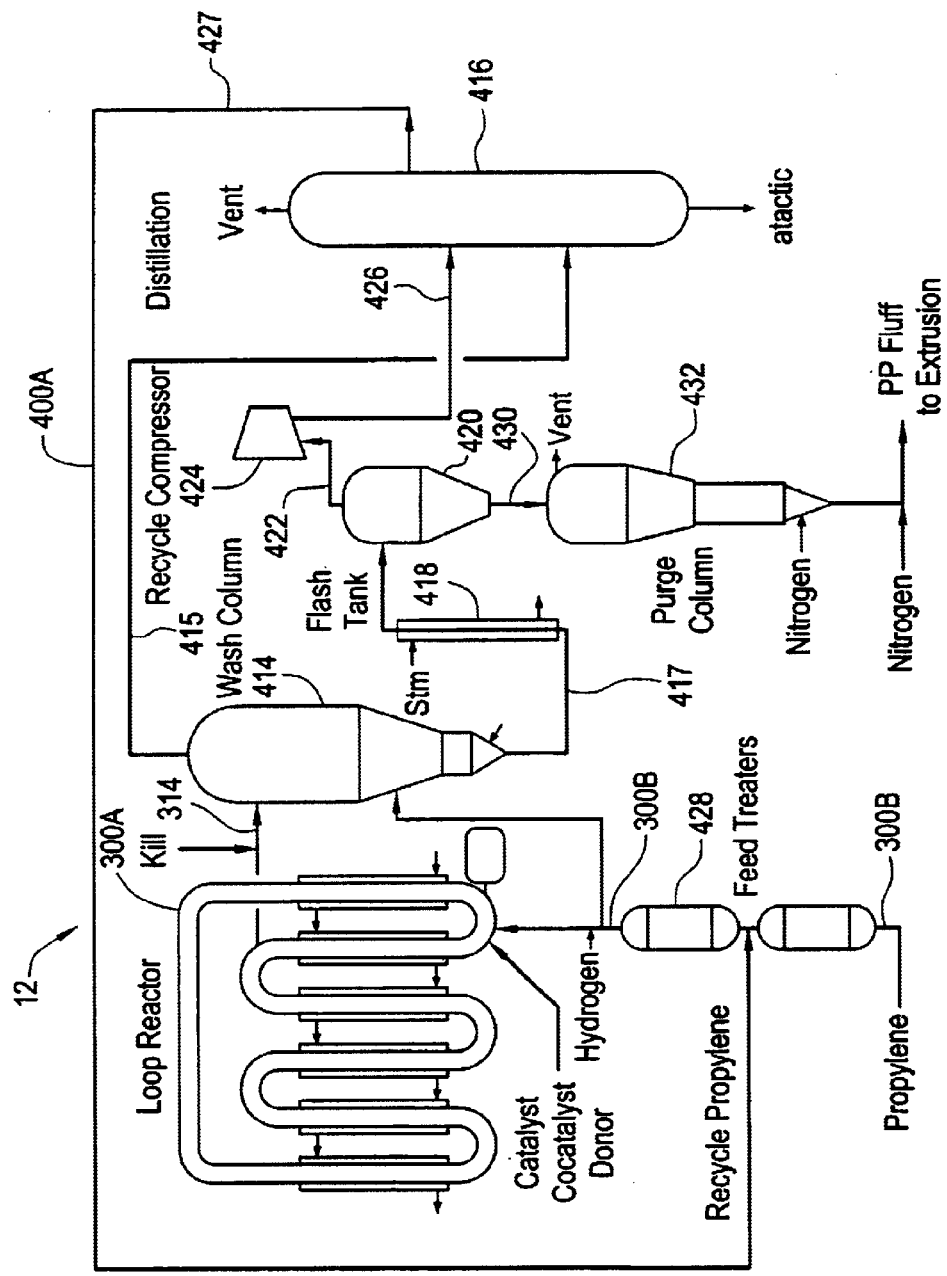
FIG. 2 is schematic plan view of another bulk loop reactor system.

Another bulk loop reactor system 12 suitable for propylene polymerization using one or more conventional Zeigler-Natta catalysts is illustrated in FIG. 2. The bulk loop reactor system 12 is similar to the bulk loop reactor system 10 with the exception that the system 12 illustrates a more extensive polymer recovery system 300A and does not illustrate a gas phase reactor or a pre-polymerization loop reactor 222. In some instances, most, if not all, active catalyst present in the propylene polymer granules exiting the loop reactor 300A via conduit 314 may be deactivated prior to entering the wash column 414. In general, propylene polymer granules separate from the liquid propylene in the wash column 414. In some instances, additional liquid propylene entering at or near the base of the wash column 414 passes through the bed of settling propylene polymer granules. Liquid propylene and a portion of the polymerization by-products exit the wash column 414 via the conduit 415 and are conveyed to a distillation vessel 416. The distillation vessel separates the liquid propylene from polymerization by-products, such as atactic polypropylene.

The remaining propylene polymer granules, propylene monomer and polymerization by-products exit the wash column 414 via conduit 417 and enter the heating column 418. The propylene polymer granules may exit the wash column 414 continuously or in batches. Sufficient heat is applied to the propylene polymer granules such that upon entering the flash tank 420, a substantial portion of the liquid propylene monomer accompanying the propylene polymer granules vaporizes, thus separating from the granules. The gaseous propylene and other polymerization by-products are extracted from the flash tank 420 via the conduit 422. The gaseous propylene may be recompressed by the recycle compressor 424 and conveyed via conduit 426 to the distillation vessel 416. Liquid propylene monomer exits the distillation vessel via conduit 427 and may be conveyed to one or more propylene feed treaters 428 wherein the propylene may be filtered as described above before being returned to the loop reactor 300A. The propylene polymer granules exit the flash tank 420 via conduit 430 and enter the purge column 432. Upon exiting the purge column 432, the propylene polymer granules may be directed to extruders for processing into pellets as previously described.

Ziegler-Natta to Metallocene Bulk Loop Reactor Transition

It has been found that metallocene catalyst systems can also be used to produce propylene polymers in bulk loop reactors. However, in some instances Ziegler-Natta catalyst systems and/or components thereof may not be compatible with metallocene catalyst systems and/or components thereof. Additionally, it has been found that certain conditions and equipment design of the bulk loop reactor system which are suitable for propylene polymerization using one or more Ziegler-Natta catalyst systems may not be suitable or less than suitable for propylene polymerization using one or more metallocene catalyst systems. Therefore, it is desirable when transitioning between Ziegler-Natta catalyst systems and metallocene catalyst systems for the production of polypropylene on a common loop reactor and or common loop reactor system, to employ one or more changes to the methods of operating the bulk loop reactor systems and/or employ one or more changes to the design of components for the bulk loop reactor system. These and other changes shall now be described in greater detail.

Catalyst Mixing and Injection System

Referring to FIG. 1, traditionally, Ziegler-Natta catalysts are dry-mixed with the high molecular weight mineral oil in about a 1:2 ratio in the mixing vessel 202. In many instances, drying the metallocene catalyst, and particularly drying the supported metallocene catalyst, may damage its productivity (degradation due to heat and also to trace impurities such as oxygen, moisture during the drying process). It is desirable to store and deliver the supported metallocene catalyst to the bulk loop reactor system in a lower molecular weight mineral oil slurry. The weight percent (wt %) of the supported metallocene catalyst system in the mineral oil slurry may vary from 1 wt % to at least 50 wt %, and desirably from 5 wt % to 30 wt %.

If the high molecular weight mineral oil paste is used to carry the metallocene catalyst system, the temperature within the mixing vessel 200 should be reduced to a temperature sufficient to avoid deactivating the metallocene catalyst during the mixing thereof with the mineral oil. Generally, thermal deactivation of the metallocene may be avoided by heating the metallocene to temperatures below 60° C., and desirably below 30° C. As such, it is desirable to reduce the viscosity of the high molecular weight mineral oil by the addition of solvent, such as hexane, and heat as opposed to merely heating. Once the metallocene catalyst is substantially distributed within the mineral oil, the solvent may be vacuum extracted and the resulting "paste" conveyed into the injector 210.

If the catalyst mixing system 200 used for the Ziegler-Natta catalyst system is also used for the metallocene catalyst system, residual Ziegler-Natta catalyst may produce high molecular weight atactic polypropylene, under the conditions in which metallocene polypropylene is generally produced (low amount of hydrogen, no external donor). This high molecular weight material may become a source of gels in the metallocene polypropylene. In many instances, residual electron donor may act as a strong poison for metallocene catalysts. It was therefor desirable to clean the mixing vessel 202 and all related conduits of such Ziegler-Natta catalysts and residual electron donors. Additionally, as such Ziegler-Natta catalysts and residual electron donors may be present in other components of the bulk loop reactor system, such as the propylene monomer recycle components, it is desirable to clean and/or purge the other components of the bulk loop reactor system as well before introducing metallocene catalysts. The catalyst mixing system 200 may be cleaned, for example, by opening the system and introducing mineral oil under high pressure. Desirably, the catalyst mixing system 200 may be similarly cleaned when transitioning the catalyst mixing system 200 from metallocene catalysts to Ziegler-Natta catalysts.

Alternatively, a separate catalyst mixing system dedicated to the metallocene catalyst system may be used (as described in greater detail below and illustrated in FIG. 3). In this way, cleaning the catalyst mixing system 200 of Ziegler-Natta catalysts systems and/or components prior to the introduction of a metallocene catalyst system may be avoided. However, cleaning the other components of the bulk loop reactor with mineral oil so as to purge these components of Ziegler-Natta catalysts systems and/or components thereof may be expensive and time consuming. Alternatively, the other components may be cleaned or purged by one or several ways and/or a combination thereof.

In one instance, the Ziegler-Natta catalyst circulating within the loop reactors can be deactivated and the deactivated catalyst substantially removed via normal take-off after between 3 to 5 loop residence times or after between 3 to 10 hours (1 to 2 hr/residence time) have elapsed. If electron donor was present with the Ziegler-Natta catalyst, the Ziegler-Natta catalyst is deactivated as described above, however to purge the loop reactors and components thereof, such as the polymer recovery system of electron donor, the bulk loop reactor system may be operated for an additional period of time, generally between 5 hours to 10 hours, in order to purge the components of electron donor.

In another instance, if the Ziegler-Natta catalyst system includes an electron donor, that catalyst system may be transitioned to a non-electron donor Ziegler-Natta catalyst system. In this way, propylene polymer production continues as the bulk loop reactor system is purged of electron donor. Prior to transitioning to a metallocene catalyst system, the Ziegler-Natta catalyst system is deactivated and the reactors are purged after 3 to 5 loop residence times. As such, while not only producing propylene polymers during the electron donor purge, this method of cleaning the loop reactor is accomplished in substantially less time than the above described method.

In still another instance, the Ziegler-Natta catalyst can be deactivated and the metallocene catalyst system introduced into the bulk loop reactor system. In this way, the loop reactor and polymer recovery system may be purged by production of metallocene polypropylene. This method may take between 8 hours and 24 hours to sufficiently purge the loop reactor system of Ziegler-Natta catalyst and/or components thereof.

When transitioning from a metallocene catalyst system to a Ziegler-Natta catalyst system, the above procedures may be employed to purge the loop reactors and associated components of metallocene catalyst systems. The time periods for transitioning from a metallocene catalyst system to a Ziegler-Natta catalyst system are similar to the time periods for transitioning from a Ziegler-Natta catalyst system to a metallocene catalyst system. As such, in one instance the metallocene catalyst system may be deactivated and purged from both the loop reactors and the associated components. In another instance, a non-electron donor Ziegler-Natta catalyst system may be introduced allowing continued propylene polymer production while purging the loop reactors and associated components of metallocene. In still another instance, the metallocene catalyst system may be deactivated followed by the introduction of a Ziegler-Natta catalyst system into the loop reactors.

Figure 3:
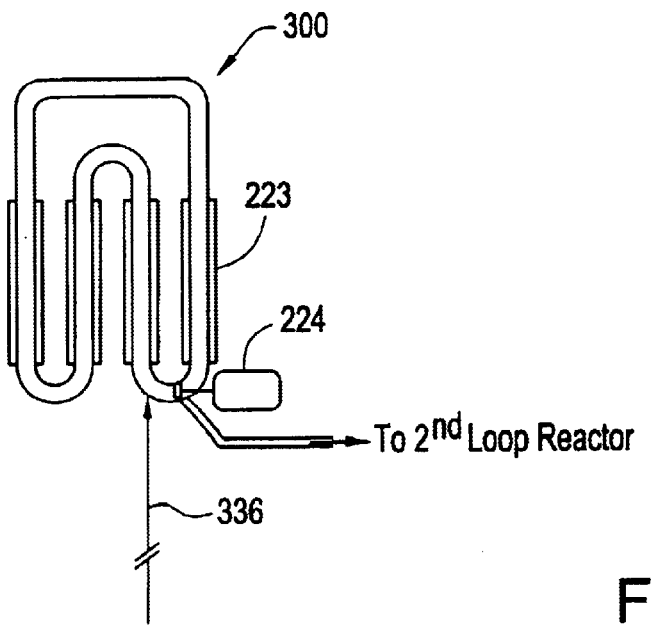
FIG. 3 is a schematic plan view of a loop reactor component of a bulk loop reactor system.
Figure 3A:
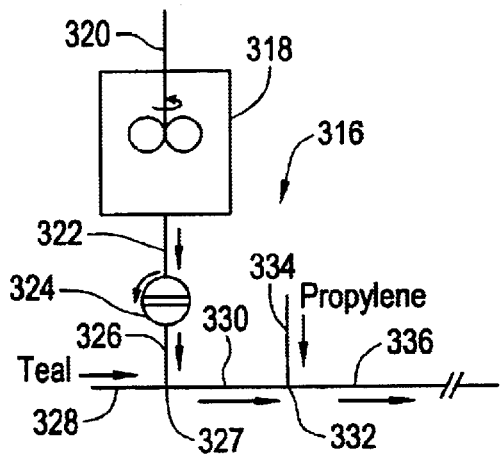
FIG. 3A is a schematic plan view of a catalyst mixing and injection system.
Figure 3B:
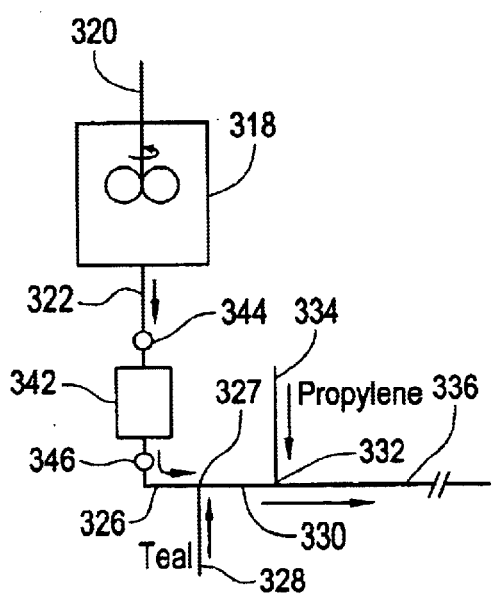
FIG. 3B is a schematic plan view of another catalyst mixing and injection system.

Referring to FIG. 3, two metallocene catalyst mixing systems, FIG. 3A and FIG. 3B are illustrated. While neither system requires the use of the pre-polymerization loop reactor before the introducing the metallocene catalyst into the loop reactor 300, either system may be used with the pre-polymerization loop reactor.

The metallocene catalyst mixing system 316, illustrated in FIG. 3A, includes a mixing vessel 318 having a mixing paddle 320 for sufficiently mixing and maintaining a sufficient distribution of the metallocene catalyst and cocatalyst in the mineral oil slurry. The wt % of metallocene catalyst system in mineral oil is generally between 1 and 50 and desirably between 5 and 30. The metallocene catalyst slurry is conveyed by conduit 322 to a valve 324. As the valve 324 is opened, a portion of the slurry enters a conduit 326. When the valve 324 is closed, the flow of slurry into conduit 326 is interrupted. Generally, the frequency of slurry introduction into the conduit 326 may be between 1 to 10 times per minute. The amount of slurry in each "slug" may be between 10 and 50 milliliters.

The conduit 326 intersects at the junction 327 with conduit 328. Conduit 328 may supply a scavenger and/or co-catalyst, such as TEAL or TIBAL, in an amount for example between 1 and 2 weight ratio of TEAL to the supported catalyst, to the junction 327 at which point the metallocene catalyst/cocatalyst and TEAL are combined or are "precontacted". Optionally, the metallocene catalyst and cocatalyst can be separately introduced into the bulk loop reactor. In this instance, there may be some loss of catalyst activity and loss of propylene polymer granule morphology. However, it is generally desirable, when using either catalyst system, to precontact the catalyst with a scavenger, such as TEAL (in either a mixing vessel, such as mixing vessel 202, FIG. 1 or in conduit 330, FIG. 3A) prior to beginning polymerization (generally at and/or downstream of the junction 332). In this way, TEAL is readily available as an impurity scavenger, thus protecting the catalyst during the initial contact with propylene. Additionally, while neat TEAL may be used, when TEAL is combined with a solvent, the solvent, such as hexane or other C4 to C20 hydrocarbons, acts to reduce the viscosity of the mineral oil surrounding the catalyst and thus improves the diffusion of propylene relative to the catalyst particles which may improve polymerization.

When using conventional Ziegler-Natta catalyst systems, addition of more TEAL (in the range of from 5:1 to 15:1 lbs. of TEAL to lbs. of supported catalyst) boosts the activity of the catalyst. For the metallocene catalyst system, a minimum of amount of TEAL and or TIBAL (in the range of from 1:4 lbs. of TEAL or TIBAL to lbs. of supported catalyst to 4:1 lbs. TEAL or TIBAL to lbs. of supported catalyst, and desirably 1:1 lbs. of TEAL or TIBAL to lbs. of supported catalyst) is desirable as a scavenger and in precontact as described above. However, generally excess scavenger, such as TEAL (greater than 4:1 lbs. of TEAL to lbs. of supported catalyst) may reduce catalyst activity and promote fouling.

The precontact time for Ziegler-Natta catalyst may be several minutes, ranging from 5 to 15 minutes. For metallocene catalyst, the precontact time is desirably less than one minute, and more desirably less than 30 seconds and still more desirably less than or equal to 15 seconds. For instance, where the diameter of the conduit 330 is 0.5 inches, the line length of conduit 330 is 15 feet, the TEAL solution is entering the junction 327 at around 12 lbs./hr (5 wt % dilution in hexane), the metallocene catalyst/mineral oil slurry is entering the junction 327 at around 6 gals/hr, the flow time in conduit 330 would be around 15 seconds.

Downstream of the junction 327, conduit 330 supplies the metallocene catalyst/cocatalyst to the junction 332 where propylene monomer, conveyed by conduit 334, combines with the active metallocene catalyst/cocatalyst and travels for a distance in the conduit 336 before entering the loop reactor 300. Because propylene polymer polymerization begins at or generally downstream of the junction 332, it is desirable to convey the polymerizing metallocene catalyst into the reactor before plugging of the conduit 336 occurs by the accumulation of propylene polymer granules. Depending upon the size of the conduit 336 and the flow speed of material therein, it is desirable to convey the materials from junction 332 to the bulk loop reactor in generally less that about one minute and desirably less than 30 seconds and still more desirably less or equal to 15 seconds and most desirably between 10 and 0.001 seconds. For example, where the diameter of the conduit 336 is 0.5 inches and is 15 feet in length, the propylene flow rate is around 10 gal/min in conduit 334 and the flow in the conduit 336 is around 5 m/sec, the polymerization time in the conduit 336 is around 1 sec.

In order to reduce plugging the conduit 336 with propylene polymer granules, the metallocene/cocatalyst mixture and propylene may be combined under conditions such that polymerization rate in conduit 336 is slower than the polymerization rate in the bulk loop reactor 300. This may be done, for example, by cooling one or more of the metallocene, cocatalyst and/or propylene components before or after combining one or more thereof. Generally one or all such components may be cooled to a temperature of between −10° C. and +10° C. Maintaining a flow rate, for example, of between 0.3 m/sec to 10 m/sec in the conduit 336 will also reduce the risk of plugging. The flow rate in the conduit 336 may be a factor of the individual flow rates of the individual components. Desirably, the flow rate of the metallocene catalyst in conduit 326 and cocatalyst in conduit 328 are lower than the flow rate of the propylene in conduit 334. The different flow rates may promote mixing of the metallocene catalyst upon contact with the propylene.

Referring now to FIG. 3B, the metallocene catalyst mixing system 340 is substantially similar to the metallocene catalyst mixing system 316, except that a pump 342, desirably a membrane pump (150 l/hr, 0–80 barg.), having an upstream check valve 344 and a downstream check valve 346 replace the valve 324 of FIG. 3A. In this way, the catalyst, cocatalyst and propylene may be introduced into the bulk loop reactor in a more continuous fashion (the frequency of slurry slugs being, for example, from between 60 and 120 times per minute in an amount ranging from between 4 to 16 milliliters) than that provided by the valve 324 (FIG. 3A). In addition to a more continuous and/or more frequent additions, the smaller volumes of catalyst and cocatalyst introduced into the bulk loop reactor may minimize swings in reactor temperatures caused by the polymerization reaction.

Figure 4:
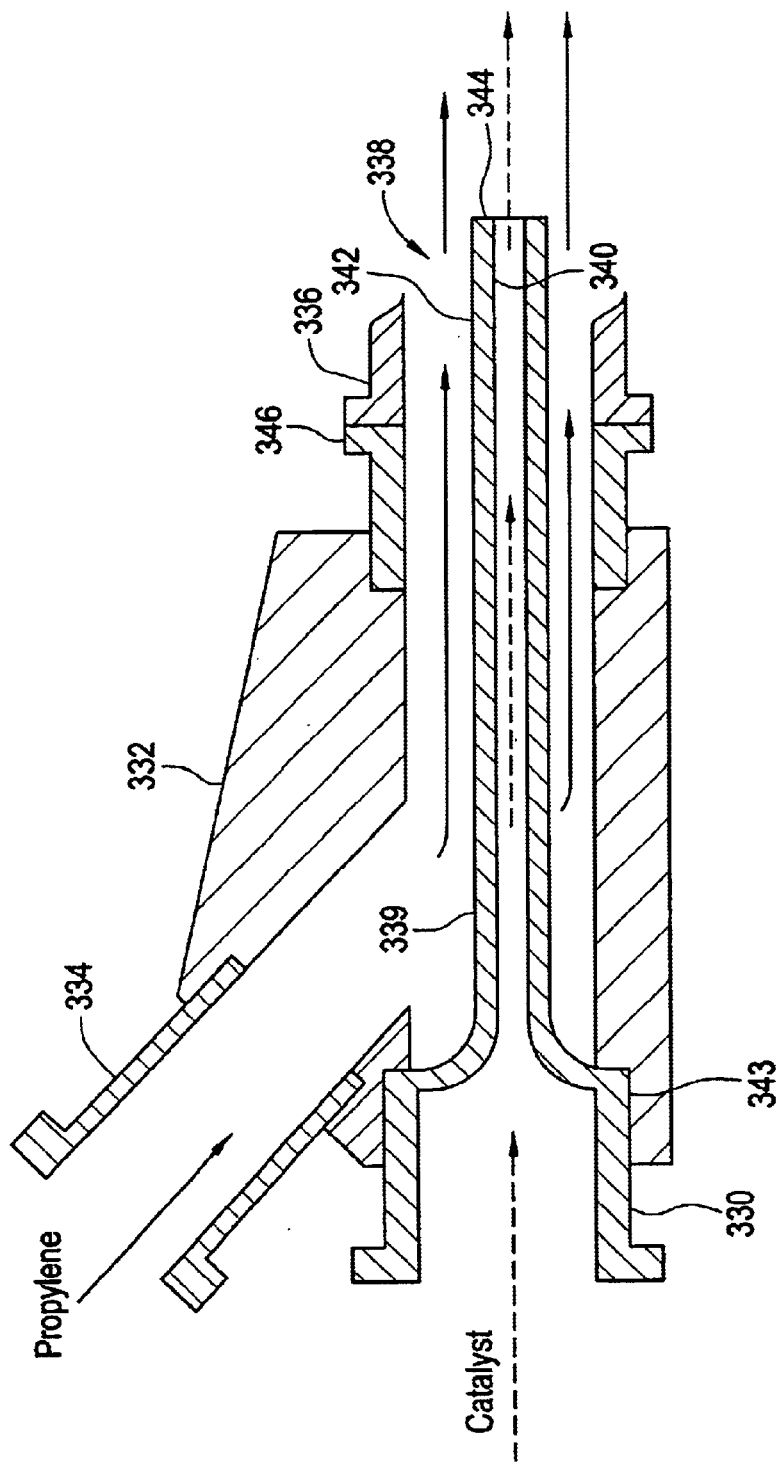
FIG. 4 is a cross-sectional view of a conduit junction receiving propylene and catalyst and illustrating a quill.

Referring now to FIG. 4, it may be desirable to install a quill 338 having portions thereof defining a quill body 339, a quill bore 340, an external surface 342, an upstream end 343 and a downstream end 344. The upstream end 343 of the quill 338 may be formed integral with conduit 330 or it may be secured, such as for example by engaging threads, flanges or welding, to conduit 330. The quill bore 340 is in fluid communication with the conduit 330. The quill body 339 extends into the junction 332 from conduit 330. Desirably, the outside dimensions of the quill body 339 are sized such that the flow of liquid propylene (illustrated by the solid arrows) entering the junction 332 via conduit 334 contacts the external surfaces 342 of the quill 338 as the liquid propylene travels towards conduit 336. Additionally, the length of the quill body 339 is sufficiently long enough such that the downstream end 344 terminates downstream of the junction 332 and desirably terminates within the conduit 336 and more desirably terminates within conduit 336 downstream of the connecting flanges 346. As such, the flow of catalyst (illustrated by broken lines) enters conduit 336 and mixes with the flow of liquid propylene downstream of the junction 332 and the flanges/weld seams associated therewith. In this way, propylene polymerization at/or within the junction 332 is reduced and/or eliminated which in turn reduces and/or eliminates the opportunity for catalyst particles to accumulate at and/or near the connecting flanges 346 and their associated gaskets (not shown).

Additionally, it is desirable that the internal bore surfaces defined by the conduits and junction described in FIGS. 3A, 3B and FIG. 4 have minimal or no gaps, ridges, protrusions, texturing or other similar structures or features that would allow the metallocene catalyst particles and/or propylene polymer granules to accumulate in and/or on the bore surfaces and not be swept into the reactor by the flow in conduit 336. Such gaps ridges and protrusions may be caused by, for example, gaskets, welds, non-alignment of flanges and the like. Any such particle or granule not swept into the reactor may continue to grow and/or cause other particles to accumulate, the occurrence of either or both may create a plug or obstruction in the bore. Therefore, it is desirable that the surfaces defining these bores are smoothed, such as by electro-polishing, and the gaskets should be chosen to avoid gaps at the flanges. For example, it is desirable that the surfaces and/or portions thereof defining the bore have a roughness value of between 0 rms and 120 rms and desirably between 8 rms and 20 rms as measured by techniques known to those skilled in the art.

Loop Reactors

Generally, there are minimal changes made in the reactor when using a conventional Ziegler-Natta catalyst system compared to using a metallocene catalyst system. However, there are several design considerations of the loop reactor that are desirable.

For example, the bulk densities of the propylene polymer granules made by the Ziegler-Natta catalyst system may vary as compared to the bulk densities of the propylene polymer granules made by the metallocene catalyst system. However, in some instances, when making a metallocene polypropylene random copolymer with ethylene, the bulk density of the metallocene polymer granules may be similar to the polypropylene homopolymer granules formed by conventional Ziegler-Natta catalyst systems. For example, the bulk density can drop from e.g., 25 lbs./cu. ft. (0.45 g/cc) for a homopolymer to e.g., 18 lbs./cu. ft. (0.30 g/cc) for a copolymer. The lower bulk density (i.e. higher specific volume, or volume/lbs.) is generally more difficult to circulate in the reactor. As such, the loop reactor circulating pump impeller and motor must be designed for a higher horsepower load.

Another modification when using a conventional Ziegler-Natta catalyst system compared to using a metallocene catalyst system is the addition of an anti-fouling agent. In some instances, over a period of time, a build up of a polymer coating inside of the loop reactor, or in the product take-off line leading from the reactor can occur. The use of the anti-fouling agent prevents such polymer coatings from forming. The anti-fouling agent may be added to the propylene fed to the reactor. Or it may be added such that the anti-fouling agent is also present in the catalyst mixing and injection system, thus reducing the risk of conduit plugging.

In some instances, the use of an anti-fouling agent may cause a decrease in the metallocene catalyst activity. An example of a suitable anti-fouling agent is a dinonylnaphtyl sulfonic acid based anti-fouling agent, such as Stadis 450 Conductivity Improver, a product of Octel Starreon, LLC (hereafter referred to as "Stadis"). Stadis may be used at concentrations of between 0.1 ppm and 5 ppm in the propylene feed (conduit 300B (FIG. 1)) to the reactor or in such concentrations when added directly to the catalyst mixing and injection system. However, the addition of the anti-fouling agent directly to the catalyst mixing and injection system upstream of the propylene injection (conduit 334, FIG. 3A and FIG. 3B) may result in higher concentrations of anti-fouling agent contacting the catalyst as compared to adding the anti-fouling agent directly to the reactor via the propylene feed conduit 300B or adding the anti-fouling agent at or down stream of the propylene injection (conduit 334) in the catalyst mixing and injection system. Contacting the catalyst with higher concentrations of anti-fouling agent in the catalyst mixing and injection system may increase the level of catalyst deactivation. As such, it may be desirably to reduce the concentration of anti-fouling agent contacting the catalyst in the catalyst mixing and injection system. This may be accomplished in many ways, such as for example by adding a portion of the anti-fouling agent upstream of the point of contact of the propylene and the catalyst in the catalyst mixing system, or by adding all or a portion of the anti-fouling agent at the point of contact of propylene and the catalyst in the catalyst mixing and injection system or by adding all or a portion of the anti-fouling agent at a point downstream of propylene injection conduit 334 in the catalyst mixing and injection system or by adding the antifouling agent to the propylene feed conduit 300B which is in fluid communication the propylene injection conduit 334 such that a portion of the antifouling agent enters the catalyst mixing and injection system via the propylene injection conduit 334.

Other possible antistatic agents may be used such as ethylene oxide based anti-fouling agents. Examples of an ethylene oxide/propylene oxide block copolymer antifouling agent are sold under the trade-names Synperonic or Pluronic a product of ICI and BASF, respectively. Synperonic or Pluronic antifouling agents may prevent fouling as effective as Stadis with the additional advantages of minimal loss in catalyst activity at concentrations in the range of 2 ppm to 100 ppm.

Also, it has been observed that anti-fouling agents seems to have a lasting effect upon a reactor (that is, the anti-fouling effects will last some times even after the addition of the anti-fouling agent is interrupted). As such, it may be desirable to initially feed the anti-fouling agent at a first level ranging between 5 ppm and 10 ppm and then after the passage of time (from between 10 minutes to at least 20 minutes) reduced the feed of anti-fouling agent to a second level ranging between 2 ppm and 5 ppm. Reducing the feed of anti-fouling agent in to the bulk loop reactors should reduce the loss in metallocene catalyst activity and thus improve propylene polymer through put.

A comparison between Ziegler-Natta catalyst systems (Z-N) and metallocene catalyst systems (MCN), dilutions, densities and residence time in bulk loop reactors is provided in Table 1.

TABLE 1

|  | Units | Z-N | MCM |
|---|---|---|---|
| 1st Loop Reactor |  |  |  |
| Propylene Feed | t/h | 31 | 34–38 |
| Density | g/l | 555 | 540–560 |
| Solids | % wt | 50 | 45–55 |
| Contribution | % final production | 62 | 65–69 |
| Temperature | ° C. (° F.) | 70 (158) | 68–75 |
| PP Production | t/h | 15.5 | 15–18 |
| Residence time | Min | 43 | 35–45 |
| 2nd Loop Reactor |  |  |  |
| Propylene Feed | t/h | 16 | 10–12 |
| Density | g/l | 540 | 535–550 |
| Solids | % wt | 46 | 45–55 |
| Contribution | % final production | 38 | 31–35 |
| Temperature | ° C. (° F.) | 70 (158) | 68–75 |
| TOTAL |  |  |  |
| PP Production | t/h | 25 | 20–30 |
| Propylene Feed | t/h | 47 | 40–50 |
| Residence time | Min | 68 | 55–80 |

In some instances, the electrical consumption of the reactor circulating pumps may be lower with the metallocene catalyst system as compared to the Ziegler-Natta catalyst system. Table 2 compares MCN and Z-N for a dual loop reactor. Lower kWh means that the circulating speed is higher. This is typical for propylene polymer granules having an average particle size of around d50.

TABLE 2

|  | Units | Z-N | MCN |
|---|---|---|---|
| Reactor 1 |  |  |  |
| Density | g/l | 555 | 550 |
| Circulating Pump | KWh | 215 | 198 |
| Reactor 2 |  |  |  |
| Density | g/l | 540 | 540 |
| Circulating Pump | KWh | 248 | 228 |

In those instances when one of the catalyst systems, for example the metallocene catalyst system, produces propylene polymer having a lower melting point than the propylene polymer produced by the other catalyst system, for example the Ziegler-Natta catalyst system, an adjustment of the polymer recovery system parameters may be desirable. For example, when the metallocene polypropylene homopolymer has melting point of, for example 150° C., and a conventional Ziegler-Natta polypropylene homopolymer has a melting point of, for example 165° C., the polymer recover system may be adjusted to lower temperatures. Example settings in the polymer recover system for a Ziegler-Natta random copolymer and for a metallocene PP homopolymer having a melting point of 150° C. would be:

Flash T°: 65–70° C. for metallocene PP homopolymer (instead of 90° C.)

Flash p: <1.7 barg

N2 T° in fluidized bed dryer: 105–110° C. for metallocene PP homopolymer (instead of 120° C.)

ATMER antistat, a product of ICI Americas, Inc. which reduces and/or kills the activity of either a Ziegler-Natta catalyst system or a metallocene catalyst system in flash line at 5 kg/h (lower thus than for ZN to avoid static problems in the cyclone).

While the invention has been shown in only some of its forms, it should be apparent to those skilled in the art that it is not so limited, but is susceptible to various changes and modifications without departing from the scope of the invention.

We claim:

1. A method of polymerizing propylene in a bulk loop reactor having a first temperature range comprising the steps of:

introducing a quantity of metallocene catalyst having a second temperature range at a first frequency rate into the bulk loop reactor from a first catalyst mixing system in communication with the bulk loop reactor; and introducing a quantity of Ziegler-Natta catalyst having a third temperature range at a second frequency rate into the bulk loop reactor from a second catalyst mixing system in communication with the bulk loop.

2. The method of claim 1 wherein the first frequency rate is higher than the second frequency rate.

3. The method of claim 1 wherein the first frequency rate of injection is between 60 and 120 times per minute.

4. The method of claim 1 wherein the first temperature range is higher than the second temperature range.

5. A method of polymerizing propylene in a bulk loop reactor comprising the steps of:

contacting a quantity of supported metallocene catalyst with a first quantity of scavenger prior to injecting the supported metallocene catalyst into the bulk loop reactor; and contacting a quantity of Ziegler-Natta catalyst system with a second quantity of scavenger prior to injecting the Ziegler-Natta catalyst system into the bulk loop reactor, wherein the second quantity of scavenger is greater that the first quantity of scavenger.

6. The method of claim 5 wherein the first and second quantity of scavenger includes a quantity of TEAL.

7. The method of claim 5 wherein the first quantity of scavenger and supported metallocene catalyst are present in a ratio range from 1:4 of scavenger to supported metallocene catalyst to 4:1 of scavenger to supported metallocene catalyst.

8. The method of claim 5 wherein the second quantity of scavenger and Ziegler-Natta catalyst system are present in a ratio range from 5:1 of scavenger to Ziegler-Natta catalyst system to 15:1 of scavenger to Ziegler-Natta catalyst system.

* * * * *